United States Patent
Kusayanagi et al.

(10) Patent No.: US 6,751,434 B2
(45) Date of Patent: Jun. 15, 2004

(54) INTERMEDIATE TRANSFER MEMBER WITH HIGH PLANARITY AND METHOD OF MAKING THE MEMBER

(75) Inventors: Makoto Kusayanagi, Minamiashigara (JP); Seiji Ogihara, Minamiashigara (JP); Toshihiko Tomita, Fukaya (JP); Kiichiro Matsushita, Fukaya (JP); Tokio Fujita, Fukaya (JP)

(73) Assignees: Fuji Xerox Co., Ltd., Tokyo (JP); Nitto Denko Corporation, Osaka (JP)

( * ) Notice: Subject to any disclaimer, the term of this patent is extended or adjusted under 35 U.S.C. 154(b) by 0 days.

(21) Appl. No.: 09/975,252

(22) Filed: Oct. 12, 2001

(65) Prior Publication Data

US 2002/0141784 A1 Oct. 3, 2002

(30) Foreign Application Priority Data

Nov. 14, 2000 (JP) .......................... 2000-346745

(51) Int. Cl.[7] .............................................. G03G 15/16
(52) U.S. Cl. ...................... 399/302; 399/308; 428/220
(58) Field of Search ................. 399/302, 308, 399/297; 428/58, 57, 409, 220, 141; 264/496

(56) References Cited

U.S. PATENT DOCUMENTS

| | | | |
|---|---|---|---|
| 5,802,442 A | * 9/1998 | Konno et al. | 399/308 |
| 6,217,964 B1 | * 4/2001 | Ndebi et al. | 428/36.91 |
| 6,228,448 B1 | * 5/2001 | Ndebi et al. | 428/36.91 |
| 6,336,025 B1 | * 1/2002 | Saeki | 399/301 |
| 6,350,844 B1 | * 2/2002 | Ono et al. | 528/170 |

FOREIGN PATENT DOCUMENTS

| | | |
|---|---|---|
| JP | 61-280977 | * 12/1986 |
| JP | 1-136708 | * 5/1989 |
| JP | A 4-50973 | 2/1992 |
| JP | A 5-77252 | 3/1993 |
| JP | A 5-142975 | 6/1993 |
| JP | B2 2560727 | 9/1996 |
| JP | 10-63115 | * 3/1998 |
| JP | 11-235765 | * 8/1999 |
| JP | A 2000-155476 | 6/2000 |
| JP | A 2000-276005 | 10/2000 |

* cited by examiner

Primary Examiner—Quana M. Grainger
(74) Attorney, Agent, or Firm—Oliff & Berridge, PLC (57) ABSTRACT

An intermediate transfer member, which is used for a tandem color image forming device, is formed in an endless belt shape, and includes a polyimide resin as a main component. The planarity of the intermediate transfer member is less than or equal to 5 mm. Also, a method of fabricating the intermediate transfer member.

14 Claims, 2 Drawing Sheets

INTERMEDIATE TRANSFER MEMBER WITH HIGH PLANARITY AND METHOD OF MAKING THE MEMBER

BACKGROUND OF THE INVENTION

1. Field of the Invention

The present invention relates to an intermediate transfer member which is used for an electro-photographic copying machine, a printer, a facsimile machine, a combination of such machines or the like that is provided with a tandem type color image forming device having a photoreceptor for each of a plurality of colors, which photoreceptors are each provided with a developer unit and disposed at the intermediate transfer member, and to a method of fabricating the intermediate transfer member.

2. Description of the Related Art

In an image forming device in which an electro-photographic system is applied, a latent image holding member which consists of an inorganic or organic photo-conductive photosensitive material (which can be referred to simply as a "photoreceptor" hereinafter), is charged uniformly. Subsequently, an electrostatic latent image is formed on the latent image holding member by light of a laser or light of a light emitting diode (LED) which light is obtained by modulation of image signals. The electrostatic latent image is developed with the charged toner to thereby form a visualized toner image. The toner image is electrostatically transferred, via an intermediate transfer member or directly, onto a transfer material such as paper so that a required image is obtained. Specifically, there has been known an intermediate transfer process comprising a first transfer process and a second transfer process. In the first transfer process, the toner image formed on the latent image holding member is first transferred onto an intermediate transfer member. In the second transfer process, the toner image transferred onto the intermediate transfer member is then transferred onto paper.

Examples of raw materials used for forming an endless belt which is used in the image forming device employing the aforementioned intermediate transfer process include: a polycarbonate resin (PC), polyvinylidene fluoride (PVDF), polyalkylenephthalate (PAT), a blended material thereof and a thermoplastic resin such as an ethylenetetrafluoroethylene copolymer (ETFE), which raw materials can form a semi-conductive endless belt.

Japanese Patent No. 2560727, Japanese Patent Application Laid-Open (JP-A) No. 5-77252, and the like disclose an intermediate transfer member in which ordinary carbon black is dispersed as electrically conductive powder in a polyimide resin.

Figure 1:
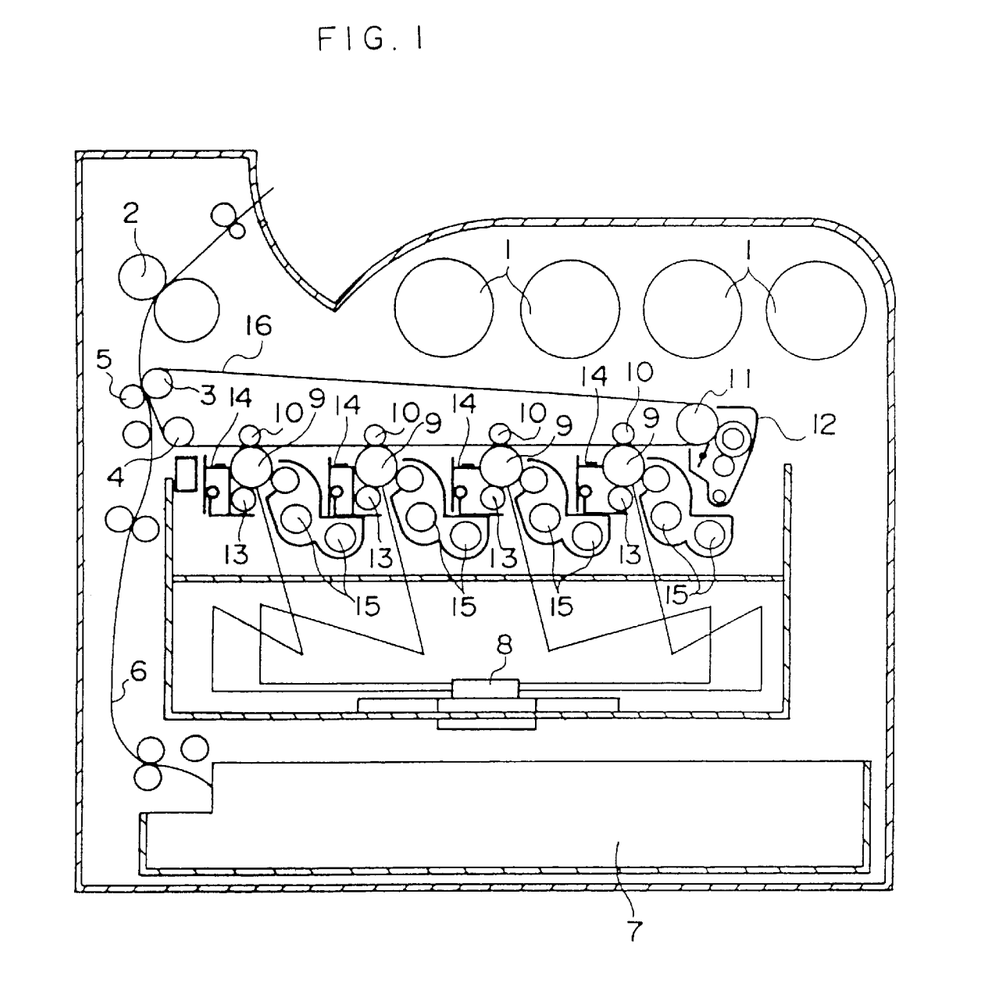
FIG. 1 is a schematic view of a tandem type color image forming device.

Tandem type intermediate transfer process color image forming devices and the like have been investigated as novel image forming devices employing this kind of intermediate transfer member (see FIG. 1). For example, in the device shown in FIG. 1, a plurality of photoreceptors 9 each having a developer unit 15 for each color is disposed at the intermediate transfer member 16. Images which are separated for each color and respectively formed on each of the photoreceptors 9 are transferred onto the intermediate transfer member 16 so that a full-color image is formed on the intermediate transfer member 16 with one cycle. The full color image is then transferred onto a member all at once onto a transfer-receiving member such as paper or the like.

Conventionally, as another method for transferring an image to a member to which transfer is to be made (e.g., paper), there has also been known a transfer drum method, in which a member to which transfer is to be made (e.g., paper) is wound onto a transfer drum and the image on the photoreceptors is transferred, for each color to the paper to which transfer is to be made. In this transfer drum method, as opposed to the tandem type intermediate transfer method, when the image is transferred from the photoreceptors to the paper that is wrapped around the transfer drum, it has been necessary to rotate the transfer drum several times (e.g. four times). However, with the tandem type intermediate transfer method, an image for all colors can be transferred from a plurality of photoreceptors with a single rotation of the intermediate transfer body, whereby it is possible to improve transfer speed. Furthermore, the tandem type intermediate transfer method has the advantage of not needing to specify the body to which the final transfer is made. Accordingly, the tandem type transfer method is being examined as a promising transfer method.

However, the intermediate transfer member used in this tandem type intermediate transfer process has a diameter that is larger than that of a conventional intermediate transfer belt, and is provided with plural, for example, from two to four, independent color developer units and photoreceptors. For this reason, when the tandem type intermediate transfer process is used, it is necessary to design an image forming device capable of preventing color unevenness such as color drift and color misregistration, for each color. Namely, the intermediate transfer member that is provided at such an image forming device needs to have extremely high accuracy and a high level in planarity. For example, when the planarity is low, adhesiveness between a drive roll 11 for driving a belt and the intermediate transfer member varies by portions, and the moving speed of the belt thereby changes irregularly, thus differentiating the moving speed of the intermediate transfer member with respect to each of the photoreceptors which are provided with a developer unit for each color. As a result, there arises a serious problem in that image matching with a high level of accuracy becomes impossible, thereby causing image faults such as color unevenness. With the miniaturization of image forming devices, internal components or members of recent image forming devices tend to be closer to one another. When the planarity of the intermediate transfer member is low and irregularities or float portions are formed, various difficulties occur. The float portions approach other members and electrical discharge occurs, preventing portions of the image from forming. Further, the end portions of the intermediate transfer member are damaged by contact with other members in the vicinity thereof. In the worst case situation, the intermediate transfer member is caught by other members and broken.

For the conventional intermediate transfer member which is used for the aforementioned tandem type color image forming device and which is formed from a thermoplastic resin of the conventional technology, resistance value, thickness, surface roughness, planarity, and the like were uneven and not accurate enough. In Japanese Patent No. 2560727 and JP-A No. 5-77252 is disclosed a tandem type color image forming device in which in-plane variation of resistance value of the intermediate transfer member is improved to some degree. However, surface roughness and planarity required for the tandem type color image forming device were not satisfactory.

SUMMARY OF THE INVENTION

To solve the above-mentioned problems in the conventional technology, the following objects should be achieved.

An object of the present invention is to provide an intermediate transfer member which is used for a tandem type intermediate transfer image forming device and which has high planarity and is thereby able to form a high quality transfer image, and a fabrication method thereof. Another object of the present invention is to provide an intermediate transfer member in which electrical resistance thereof is uniform and planarity and thickness are accurate, and a fabrication method thereof.

First aspect of the present invention is an intermediate transfer member for use in a tandem type color image forming device. The intermediate transfer member comprises an endless belt shape and including as a main component a polyimide resin. The intermediate transfer member has a planarity of at most 5 mm, when the intermediate transfer member is wrapped around two substantially parallel shafts and a tension load of 4 kg is applied to one of the shafts to longitudinally stretch the intermediate transfer member, Second aspect of the present invention is a fabricating method for an intermediate transfer. The method comprises the steps of preparing a solution of polyamide acid, supplying the solution to an inner surface of a cylindrical mold and forming a film of the solution thereat, and hardening the film by heating so as to form therefrom a belt capable of retaining a belt shape when unsupported. The method further comprises the steps of removing the belt from the cylindrical mold, disposing the belt at an outer surface of a metal cylinder, heating the belt to an elevated temperature and carrying out an imide conversion reaction by maintaining the belt at a temperature of from 220 to 280° C. which is equal to or less than the temperature for at least 0.5 hours.

Third aspect of the present invention is a fabricating method for an intermediate transfer. The method comprises the steps of preparing a solution of polyamide acid, supplying the solution to an inner surface of a cylindrical mold and forming a film of the solution thereat, and hardening the film by heating so as to form therefrom a belt capable of retaining a belt shape when unsupported. The method further comprises the steps of removing the belt from the cylindrical mold, disposing the belt at an outer surface of a metal cylinder having surface roughness of from 1.2 to 2.0 μm, and heating the belt for carrying out an imide conversion reaction.

DESCRIPTION OF THE PREFERRED EMBODIMENTS

An intermediate transfer member of the present invention has a polyimide resin as a main component. Since the polyimide resin is a material with a high Young's modulus, during driving of the intermediate transfer member, the amount by which the polyimide resin is deformed by the stresses of support rolls, cleaning blades, and the like is small. For this reason, it is possible to obtain an intermediate transfer member in which image faults such as color unevenness do not easily occur. Though the raw materials are not particularly limited, polyimide resin is usually obtained by causing a polymerization reaction in the solvent between substantially equimolar tetracarboxylic acid dianhydride, or a derivative thereof, and diamine, thus forming a polyamide acid solution which can then be used. The tetracarboxylic acid dianhydride is represented by the following general formula (1).

General Formula (1)

(wherein R represents a quadrivalent organic group, which can be an aromatic group, an aliphatic group, a cyclic aliphatic group, a combination thereof such as a combination of the aromatic group and the aliphatic group, or a substituted group thereof.)

Specific examples of tetracarboxylic acid dianyhydride include: a pyromellitic acid dianyhydride, 3,3',4,4'-benzophenonetetra carboxylic acid dianyhydride, 3,3,4',4-biphenyltetra carboxylic acid dianyhydride, 2,3,3',4-biphenyltetra carboxylic acid dianyhydride, 2,3,6,7-naphthalenetetra carboxylic acid dianyhydride, 1,2,5,6-naphthalenetetra carboxylic acid dianyhydride, 1,4,5,8-naphthalenetetra carboxylic acid dianyhydride, 2-2'-bis (3,4-dicarboxyphenyl) sulfonic acid dianyhydride, perylene-3,4,9,10-tetracarboxylic acid dianyhydride, bis (3,4-dicarboxyphenyl) ether dianyhydride, ethylenetetra carboxylic acid dianyhydride, and the like.

Specific examples of diamine include: 4,4'-diaminodiphenylether, 4,4 '-diaminodiphenylmethane, 3,3 '-diaminodiphenylmethane, 3,3'-dichlorobenzidine, 4,4 '-diaminodiphenylsulfide, 3,3'-diaminodiphenylsulphone, 1,5-diaminonaphthalene, m-phenylenediamine, p-phenylenediamone, 3,3'-dimethyl-4, 4'-biphenyldiamine, benzidine, 3,3'-dimethylbenzidine, 3,3'-dimethoxybenzidine, 4,4'-diaminodiphenylsulphone, 4,4'-diaminodiphenylpropane, 2,4-bis(β-amino-tert-butyl) toluene, bis(p-β-amino-tert-butyl phenyl)ether, bis(p-β-methyl-6-aminophenyl)benzene, bis-p-(1,1-dimethyl-5-aminopentyl)benzene, 1-isopropyl-2, 4-m-phenylenediamine, m-xylylenediamine, p-xylylenediamine, di(p-aminocyclohexyl) methane, hexamethylenediamine, hepthamethylenediamine, octamethylenediamine, nonamethylenediamine, dekamethylenediamine, diaminopropyltetramethylene, 3-methylhepthamethylenediamine, 4,4-dimethylhepthamethylenediamine, 2,11-diaminododecane, 1,2-bis-(3-aminopropoxy)ethane, 2,2-dimethylpropylenediamine, 3-methoxyhexamethylenediamine, 2,5-dimethylhepthamethylenediamine, 3-methylhepthamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis [4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3\ NH_2$, and the like.

As the solvent used for the polymerization reaction of tetra carboxylic acid dianyhydride and diamine, from a viewpoint of solubility or the like, a polar solvent can be preferably used. The polar solvents are preferably N, N-dialkylamides. Specific examples of N, N-dialkylamides having low molecular weight and preferable as polar solvents include: N, N-dimethyl formamide, N, N-dimethyl acetamide, N, N-diethyl formamide, N, N-diethyl acetamide, and N, N-dimethyl methoxy acetamide. Dimethyl sulfoxide, hexamethylphospholtriamide, N-methyl-2-pyrolidone, pyridine, tetramethylene sulfone, dimethyltetramethylene sulfone, and the like are also preferable as a polar solvent. These can be used singly or in combination.

The intermediate transfer member of the present invention contains at least one oxidized carbon black in the polyimide resin. Oxidized carbon black can be obtained, through an oxidation treatment, by applying oxygen-containing functional groups (for example, a carboxyl group, a quinone group, a lactone group, a hydroxyl group, or the like) on the surface of carbon black. This oxidation treatment can be carried out by an air oxidation method in which carbon black is put into contact with air of high temperature, a method in which carbon black is made to react with nitrogen oxide, ozone, or the like at room temperature, and a method in which, after the completion of oxidation with air at high temperature, oxidation of carbon black is carried out again with ozone at low temperature, and the like.

Specific examples of oxidized carbon black include: MA100 (pH:3.5, volatile matter content:1.5%), MA100R (pH:3.5, volatile matter content: 1.5%), MA100S (pH:3.5, volatile matter content: 1.5%), #970 (pH:3.5, volatile matter content:3.0%), MA11 (pH:3.5, volatile matter content:2.0%), #1000 (pH:3.5, volatile matter content:3.0%), #2200 (pH:3.5, volatile matter content:3.5%), MA230(pH:3.0, volatile matter content: 1.5%), MA220(pH:3.0, volatile matter content: 1.0%), #2650 (pH:3.0, volatile matter content:8.0%), MA7(pH:3.0, volatile matter content:3.0%), MA8(pH:3.0, volatile matter content:3.0%), OIL7B(pH:3.0, volatile matter content:6.0%), MA77 (pH:2.5, volatile matter content:3.0%), #2350 (pH:2.5, volatile matter content:7.5%), #2700 (pH:2.5, volatile matter content: 10.0%), and #2400 (pH:2.5, volatile matter content:9.0%), all manufactured by Mitsubishi Chemical Corp; PRINTEX150T (pH:4.5, volatile matter content:10.0%), SPECIAL BLACK 350 (pH:3.5, volatile matter content:2.2%), SPECIAL BLACK 100 (pH:3.3, volatile matter content:2.2%), SPECIAL BLACK 250 (pH:3.1, volatile matter content:2.0%), SPECIAL BLACK 5 (pH:3.0, volatile matter content:15.0%), SPECIAL BLACK 4 (pH:3.0, volatile matter content: 14.0%), SPECIAL BLACK 4A (pH:3.0, volatile matter content: 14.0%), SPECIAL BLACK 550 (pH:2.8, volatile matter content:2.5%), SPECIAL BLACK 6 (pH:2.5, volatile matter content:18.0%), COLOR BLACK FW200 (pH:2.5, volatile matter content:20.0%), COLOR BLACK FW2 (pH:2.5, volatile matter content: 16.5%), and COLOR BLACK FW2V (pH:2.5, volatile matter content: 16.5%), all manufactured by Degussa Inc.; MONARCH 1000 (pH:2.5, volatile matter content:9.5%), MONARCH 1300 (pH:2.5, volatile matter content:9.5%), MONARCH 1400 (pH:2.5, volatile matter content:9.0%), MOGUL-L (pH:2.5, volatile matter content:5.0%), and REGAL400R (pH:4.0, volatile matter content:3.5%), all manufactured by Cabot Inc.; and the like.

The oxidized carbon black that is contained in the intermediate transfer member is not easily affected by oxidation due to a repetitive application of voltage. Furthermore, due to the oxygen-containing functional groups applied to the surface of the carbon black, the oxidized carbon black can be highly dispersible in polyimide and unpreferable variations of resistance can be minimized. Accordingly, unpreferable dependence on the electric field is reduced, and a concentration of electric field which is caused by a transfer voltage does not easily occur. In this way, the oxidized carbon black allows the intermediate transfer member to prevent deterioration of resistance thereof caused by the transfer voltage, to improve the uniformity of electric resistance, to reduce dependence upon the electric field, and to minimize variation of resistance due to environmental change, to prevent image faults such as formation of non-image formed portions on paper and to have an excellent image. If at least one of carbon blacks is the oxidized carbon black described above, two or more carbon blacks can be used in combination in the intermediate transfer member. If two or more types of oxidized carbon blacks are included in the intermediate transfer member, their electrical conductivities are preferably different form each other. For example, it is preferable to use carbon blacks having different properties of degree of oxidation treatment, DBP oil absorption, and/or specific surface area as measured by a BET method, which utilizes nitrogen adsorption. Any method for adding and mixing the carbon blacks can be utilized. When two or more of carbon blacks having different properties are comprised in an intermediate transfer member; for instance, after the addition of a carbon black which exhibits a high conductivity, carbon blacks having a low conductivity can be added to a solution for the intermediate transfer member to thereby allow the surface resistance to be controlled. Specific and preferable examples of an oxidized carbon black include: SPECIAL BLACK 4 manufactured by Degussa Inc. (pH: 3.1, volatile matter content: 14.0%), SPECIAL BLACK 250 manufactured by Degussa Inc. (pH: 3.1, volatile matter content: 2.0%), and the like. The amount of these oxidized carbon blacks to be included with respect to a polyimide resin is preferably 10 to 50% by weight, more preferably 10 to 30% by weight, and most preferably 15 to 25% by weight. If the amount of an oxidized carbon black is less than 10% by weight, there will be cases of uniformity of electric resistance is decreasing and thereby increasing deterioration of surface resistance of the intermediate transfer member during periods of extended used thereof. Conversely, if the amount of oxidized carbon black exceeds 50% by weight, it is difficult to obtain the desired resistance and the carbon black becomes brittle, making it undesirable for molding.

Preferably, the intermediate transfer member of the present invention comprised of a polyimide resin which an oxidized carbon black is dispersed can be obtained by: a process of preparing a polyamide acid solution in which the oxidized carbon black is dispersed; a process of forming a film (layer) on the inner surface of a cylindrical mold; and a process of carrying out imide conversion.

As a method of preparing a polyamide acid solution having two or more of oxidized carbon blacks dispersed therein, there can be considered, for example, a method in which the aforementioned acid dianyhydride component and a diamine component are dissolved and polymerized in a dispersion solution in which the two or more types of oxidized carbon blacks have been previously dispersed in a solvent, a method in which two or more of oxidized carbon blacks are dispersed in respective solvents to thereby prepare two or more carbon black dispersions, and after the acid dianyhydride component and the diamine component have been dissolved in each of these dispersions and polymerized, these polyamide acid solutions are mixed, and the like. Methods for preparing the solution are not limited, and by selecting an appropriate method from the above-described methods, a polyamide acid solution can be prepared.

The intermediate transfer member can be formed by supplying the polyamide acid solution thus obtained to the inner surface of the cylindrical mold to thereby form a coated film, and carrying out imide conversion of the polyamide acid by heating. In the present invention, in the heating process during which imide conversion of the polyamide acid is performed, imide conversion can be carried out under a heating condition that the supplied polyamide acid solution is maintained at a constant temperature over a period of 30 minutes or more. As a result of the heating condition, an intermediate transfer member with an excellent planarity can be obtained. A detailed description of the intermediate transfer member will be given hereinafter.

In the present invention, the aforementioned polyamide acid is applied to the interior surface of a cylindrical metal mold. By selecting the application method appropriately from among the following: a method using a dispenser; a method using a die; and the like, the application can be performed. At this time, the state of the inner surface of the cylindrical metal mold is preferably that of a mirror-finish. After this is done, and the polyamide acid solution is applied, the aforementioned acid solution can be formed into a coated film to be formed by raising the temperature while applying one of the following methods: a centrifugal molding method; a molding method in which a bullet-shaped travelling member is passed through a cylindrical metal mold, a rotation molding method or the like. In order to conduct the imide conversion, any suitable method can be used. For example, (i) a method whereby, after the film has been applied to the interior surface of the metal mold, it is heated in a dryer until imide conversion is completed, or (ii) a method whereby, after solution removal is carried out until the film can keep a form as a belt for the intermediate transfer medium, the film is peeled off the interior surface of the metal mold, placed on the outer surface of a metal cylinder, and the cylinder and film are heated, can be employed. In order for the intermediate transfer member to have appropriate planarity and accuracy of the outer surface thereof, use of the latter method (ii) is preferable. With regard to heating conditions or the like to be used during the process of removing the solvent, any heating condition is suitable if it can promote the removal of the solvent. However, the heating conditions are preferably 80 to 200° C. over a period of 0.5 to 5 hours, more preferably 100 to 180° C. over a period of 1 to 4.5 hours, and most preferably 120 to 160° C. over a period of 1.5 to 4 hours. After the completion of removal of the solvent, the formed material, which has been enabled to keep its belt shape, is peeled off from the inner surface of the metal mold. In order to facilitate this peeling, a mold releasing treatment can be applied to the inner surface of the metal mold.

Next, the formed material, which has been heated and hardened until it can keep the belt shape, is introduced onto the outer surface of the metal cylinder. The formed material and the metal cylinder are entirely heated to thereby cause the imide conversion reaction of the polyamide acid to proceed. It is preferable if the metal cylinder has a linear thermal expansion coefficient which is greater than that of the polyimide resin. In addition, preferable heat setting can be carried out by making the outer diameter of the metal cylinder smaller than the inner diameter of the formed polyimide mold (i.e., the precursor of the intermediate transfer member) by a predetermined amount. As a result, it is possible to obtain an endless belt having uniform thickness and planarity. The surface roughness (Ra) of the outer surface of the metal cylinder is preferably 1.2 to 2.0 $\mu$m, more preferably 1.3 to 1.9 $\mu$m, and most preferably 1.4 to 1.8 $\mu$m. If the surface roughness (Ra) of the outside surface of the metal cylinder is less than 1.2 $\mu$m, the frictional force between the intermediate transfer member and the metal cylinder is too strong. Therefore, the shrinkage of the imide conversion of the intermediate transfer member is not uniform. Because of such non-uniform shrinkage, irregularities in the thickness of the film and a decrease in accuracy of planarity occur. Further, if the surface roughness (Ra) of the outer surface of the metal cylinder is greater than 2.0 $\mu$m, the form of the outer surface of the metal cylinder is transferred onto the inner surface of the belt-shaped intermediate transfer member and, further, irregularities are formed on the outer surface of the intermediate transfer member, thus affecting and deteriorating image quality. The surface roughness (Ra) of the outer surface of the intermediate transfer member obtained from the preferable metal cylinder is preferably 1.5 $\mu$m or less, more preferably 1.3 $\mu$m or less, and most preferably 1.0 $\mu$m or less. In the present invention, surface roughness is measured according to JIS B601. If the surface roughness (Ra) of the intermediate transfer member is greater than 1.5 $\mu$m, image faults such as image noise or the like will be caused. It is thought that the reason for this is that voltage applied locally during transfer or an electric field created by discharge during a peeling off process accumulate on convex portions of the surface of the belt, thus causing these portions to change, new conductive routes to be formed, resistance to be lowered, image density to decrease and the whole image to appear noisy.

In the present invention, conditions under which the heating process during which imide conversion is carried out are not particularly limited. However, the heating time is preferably 0.5 to 2 hours at 220 to 280° C., and more preferably 230 to 270° C. for 0.8 to 1.8 hours. The precursor is preferably held for 0.5 hours or more at a predetermined heating temperature of between 220 and 280° C. It is also preferable that, after the temperature is increased at a constant rate, temperature and time are maintained constant, and then the temperature is further raised to thereby carry out imide conversion reaction. Depending upon the composition of the polyimide resin, the amount of contraction is maximized by the conditions at the time of the imide conversion. By having the contraction in the axial direction of the belt occur stably using the above method and/or condition, variation of film thickness and reduction of planarity can be avoided. The planarity of the intermediate transfer member obtained via the imide conversion as described above is 5 mm or less, preferably 4 mm or less, and most preferably 2 mm or less. In the intermediate transfer member whose planarity is 5 mm or less, noise or variation of image is prevented and color drift caused by mislocating of separate colors decreases. However, even if the intermediate transfer member has planarity of 5 mm or less, if end portions of the belt are warped vertically, the intermediate transfer member will never break during use, but, in rare cases, marks may remain on other members in the vicinity of the belt after the belt makes contact with the other members. In the intermediate transfer member whose planarity is 3 mm or less, contact with other members in the vicinities thereof does not occur during use, and color drift rarely occurs.

Figure 2:
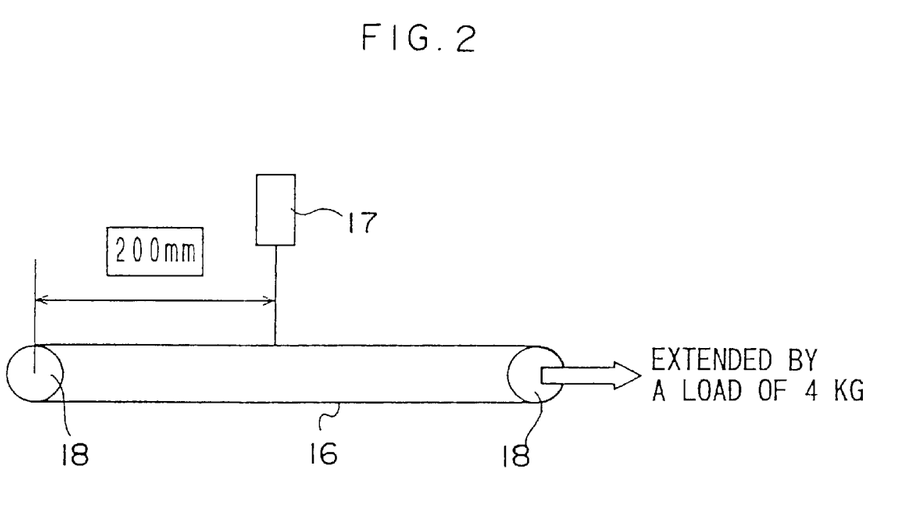
FIG. 2 is a schematic view of a measuring device for measuring planarity.

The planarity of the present invention is measured as described below. As shown in FIG. 2, two shafts 18 (($\Phi$28 mm) are provided parallel to each other and form a flat surface by tensioning the intermediate transfer member 16 over the shaft. At least one of the shafts 18 is displaceable, and one of them may be fixed. Here, one of the shafts 18 is fixed in position and the other is moved apart therefrom. A load of 4 kg is applied by the shafts 18 to the intermediate transfer member (a final product obtained) such that the intermediate transfer member is stretched by the shafts. Then, a laser displacement gauge 17 (LK-030, manufactured by Keyence Inc.) is used. The laser displacement gauge 17 is moved parallel to the two shafts 18 (in the widthwise direction of the belt) along an imaginary line located 200 mm from an axial center of the fixed shaft 18. (Namely, the laser displacement gauge 17 is moved parallel to a plane formed by the two shafts 18.) The difference between a highest and a lowest distance from the surface of the belt is measured by the laser displacement gauge 17. Such measurement is conducted by moving the laser displacement gauge 17 parallel to the two shafts (in the widthwise direction of the belt) along an imaginary line located 200 mm from an axial center of the fixed shaft 18 and by measuring from one end of the belt to the other. The measurement is conducted at least once, and preferably at least twice. The measurement is appropriately conducted at least twice to no more than twenty times. However, it is particularly preferable to conduct four, eight or twelve times. However, the number of times of the measurement is not strictly limited, and may be changed depending on the size of the belt to be measured or other conditions.

Preferably, the measurement is conducted a plurality of times due to the rotation of the belt at predetermined intervals, i.e., it is preferable to conduct the measurement at different positions of the belt. In this case, the measurement is preferably conducted plurality of times so as to reach one round of the belt. For instance, it is preferable that, when the planarity is measured eight times, the belt rotates by 1/8 round, and the measurement is conducted at each rotation. In this case, the maximum difference (difference between the maximum value and the minimum value) is selected among differences obtained from these measurements so that the planarity is determined (the distance between the surface of the intermediate transfer member and the laser displacement gauge before the measurement is 28 to 32 mm).

The intermediate transfer member of the present invention is formed in a belt-shape. However, the intermediate transfer member is preferably formed in an endless belt and a seamless belt is particularly preferable. In the case of the seamless belt, thickness thereof is appropriately determined in accordance with the purpose of usage. In general, from a viewpoint of mechanical properties such as rigidity and flexibility, a thickness of the belt and the intermediate transfer member is preferably 20 to 500 $\mu$m, more preferably 30 to 300 $\mu$m, and particularly preferably 50 to 200 $\mu$m.

However, in the present application, it is possible to use a belt other than the seamless belt, as long as it is formed in an endless belt and is able to provide appropriate planarity which is required by the present invention. The planarity can be measured by using a final product of the belt or by forming and using an endless belt which has a predetermined size.

Since such an intermediate transfer member has an excellent planarity, and can be preferably used for a tandem type image forming device, though it can also be used for a general image forming device. In the tandem type image forming device in which a plurality of image holding members are displaced, there is no need to repeat latent image forming, development, transfer, discharge, and cleaning as these is in a general transfer drum system or the general intermediate transfer system. Because of this, the tandem type device has an advantage that image forming speed is greatly increased. Further, since the intermediate transfer member of the present invention is excellent in planarity, surface roughness, and thickness accuracy, high quality images can be obtained. (Image forming device)

The image forming device of the present invention is provided with the intermediate transfer member described above, and can be applied to a tandem type color image forming device such as a device shown in FIG. 1, in which photoreceptors 9 having developer units 15 for each of four colors (black, yellow, magenta, and cyan) are provided. Since the image forming device has the intermediate transfer member of the present invention, high quality transfer images can be obtained. Specifically, in the image forming device, there can be optionally provided, by a known method and as necessarily, charging rollers 13 which uniformly charge the surfaces of the photoreceptors 9 (charging devices), a laser generating device 8 (an exposing device) which exposes the surfaces of the photoreceptors 9 and thereby forms electrostatic latent images, the developer units 15 (developing devices) which develop latent images formed on the surfaces of the photoreceptors 9 by using developers and thereby form toner images thereon, photoreceptor cleaners 14 (cleaning devices) which remove toner, dust, or the like deposited on the photoreceptors 9, a fixing roller 12 which fixes a toner image on a member, such as paper, to be transferred onto, and the like. In FIG. 1, there are shown toner cartridges 1, a back-up roller 3, a tension roller 4, a secondary transfer roller 5, a paper path 6, a paper tray 7, a primary transfer roller 10, a transfer cleaner 12, and the like.

A conventionally known image holding member such as a photosensitive material and a photoreceptor can be used as an image holding member. As a photosensitive layer thereof, a known photosensitive layer such as an organic type photosensitive layer, an amorphous silicone type photosensitive layer, or the like can be used. A cylindrical image holding member, it can be obtained by a known method such that, after aluminum or an aluminum alloy has been molded to a cylindrical form by extrusion, a surface treatment is applied thereto. Further, a belt-shaped image holding member can also be used as the image holding member.

A charging means such as a charging roller is not particularly limited. For example, there can be used a contact type charging device using a conductive or semiconductive roller, brush, film, rubber blade, or the like, or a known charging device such as a scorotron charging device or a corotron charging device utilizing corona discharge. Among these, the contact type charging device is preferable because it is excellent in charge compensation performance. A DC current is generally applied to an electrophotographic photoreceptor as a charging means, however, an AC current can be applied thereto in addition to the DC current.

An exposure means is not particularly limited. For example, light sources such as a semiconductor laser beam, an LED beam, a liquid crystal shutter beam and the like, or light via a polygonal mirror from the light sources described above can be provided as an optical instrument which is able to expose a desired image onto the surface of the electrophotographic photoreceptor.

A developing method and member can be appropriately selected in accordance with the purpose of usage. For example, there can be used a known developer unit (developing device) which develops images by contacting or non-contacting a photoreceptor with a one-component developer or two-component developer by using a brush, a roller, or the like.

A first transfer member (i.e., the member is used to transfer an image formed on the photoreceptor to the intermediate transfer member) includes: a member such as the contact type transfer charging device using a belt, a roller, a film, a rubber blade, or the like; and a member such as a known transfer charger such as a scorotron transfer charger or a corotron transfer charger utilizing corona discharge. Specifically, use of the contact type transfer charger which is excellent in transfer charge compensation performance is preferable. Further, in the present invention, a peel-off separating charger or the like can be used along with the transfer charger.

Examples of a second transfer member (i.e., the member which is used to transfer an image transferred to the intermediate transfer member to an image receiving member) include: a contact type transfer charger such as the transfer roller exemplified as the first transfer member; and a member such as a transfer charger such as the scorotron transfer charger or the corotron transfer charger. The same as for the first transfer member, use of the contact type transfer charger is preferable. When the contact type transfer charger such as the transfer roller is used to tightly press-contact the transfer member, the image is transferred in an excellent state. Further, when a contact type transfer charger such as a transfer roller is pressed against at least one of rollers for guiding the intermediate transfer member (and the intermediate transfer member and the image receiving member are disposed between the charger and at least one roller), it becomes possible for the effect of transferring the toner image from the intermediate transfer member to the image receiving member which receives the image to occur in an excellent state.

A light erasing member and method are not particularly limited. Examples of the light erasing members include: a tungsten lamp, an LED, and the like. Light quality used in the process of light erasure can be white light radiated from a tungsten lamp or the like, red light radiated from an LED or the like, and the like. Ordinarily, the intensity of irradiated light in the process of the light erasure is set so as to output an amount of light from several times to 30 times as much as the amount of light corresponding to half decay exposure sensitivity of an electrophotographic photoreceptor.

A cleaning member and method are not particularly limited, and a known cleaning device can be used.

A fixing member and method are not particularly limited, and a known fixing device such as a heat roller fixing device, an oven fixing device, or the like can be used.

EXAMPLES

A description of Examples of the present invention will be given hereinafter. However, the present invention is not limited to these Examples.

Example 1

A polyamide acid NMP solution which included 3,3', 4,4'-biphenyltetracarbonic acid (BPDA) and p-phenylenediamine (PDA) and contains an oxidized carbon black (SPECIAL BLACK 4, manufactured by Degussa Inc.) was coated on the inner surface of a cylindrical mold via a dispenser so as to have a thickness of 400 µm, and rotated at 1500 rpm over a period of 15 minutes so that a coated layer having uniform thickness was obtained. Afterward, during rotation of this coated layer at 250 rpm, the mold was dried from the outside by hot air at a temperature of 60° C. over a period of 30 minutes. Then, the layer was heated to 150° C. over a period of 60 minutes, the temperature thereof was lowered to room temperature, and a molded layer was obtained. A polyamide acid belt, which was hardened until it could support the belt itself, was peeled off the inner surface of the mold, and fitted so as to be disposed on the outer surface of an aluminum cylinder whose surface roughness (Ra) was 1.8 µm. This belt was then heated to 250° C. at a rate of 2° C./minute, and kept at 250° C. for an hour. Afterwards, this belt was heated again to 300° C. at a rate of 2° C./minute, and kept at 300° C. for 30 minutes. Consequently, an imide conversion reaction was completed. Thereafter, the temperature of the belt was lowered to room temperature to thereby obtain a desired intermediate transfer belt with a length of 950 mm, a width of 330 mm, and a thickness of 75 µm. Image evaluation was carried out as follows. This intermediate transfer belt was mounted to the tandem type color image forming device shown in FIG. 1. In the tandem type color image forming device, there were disposed the developer units 15, the photoreceptors 9, and the intermediate transfer member 16. Each of the developer units 15 contains therein four color (black, yellow, magenta, and cyan) polyester toners for DOCUPRINT C620 (which is manufactured by Fuji Xerox Co., Ltd.). Each photoreceptor 9 had a charge transport layer and a phthalocyanine type charge generating layer. Each of the charger transport layers contained therein triphenylamine for each color as a charge transfer agent, which was dispersed in polycarbonate.

The planarity of the intermediate transfer member 16 was measured as described below. Using the shafts 18, a load of 4 kg was applied by the shafts to the intermediate transfer member, which was extended with a pair of the shafts 18 (Φ28 mm) disposed parallel to each other. Using the laser displacement gauge 17 (LK-030, manufactured by Keyence Inc.), the surface of the intermediate transfer member 16 was measured by moving the displacement gauge along an imaginary line located 200 mm from an axial center of the fixed shaft 18. Then, the difference between the maximum value and the minimum value of the distance of displacement from the surface of the belt was read. The surface roughness of each of the aluminum cylinder and the intermediate transfer belt was measured in accordance with JIS B601. The surface roughness of the intermediate transfer belt was 1.4 µm and the planarity thereof was 1.2 mm. According to image evaluation, an excellent image in which noise was prevented and without color unevenness could be obtained.

Example 2

A solution was prepared in the same manner as Example 1 except for the following. A mixture of two types of oxidized carbon blacks (SPECIAL BLACK 4 and SPECIAL BLACK 250, manufactured by Degussa Inc.) was used to prepare the solution. After the completion of molding, a polyamide acid belt, which was hardened until it wad able to support itself, was peeled off from the inner surface of the mold. The belt was applied onto an aluminum cylinder whose surface roughness (Ra) was 1.4 µm, and heated to 280° C. at a rate of 2° C./minute, and kept at 280° C. for a period of 30 minutes. Then, the belt was heated again to 300° C. at a rate of 2° C./minute kept at 300° C. for 30 minutes. Consequently, the imide conversion reaction was completed. Surface roughness and planarity of the intermediate transfer belt were measured and an image was evaluated in the same manner as for Example 1. The surface roughness of the intermediate transfer belt was 1.2 µm, and the planarity thereof was 2.9 mm. According to image evaluation, an excellent image in which noise was prevented and without color unevenness could be obtained.

Example 3

A solution was prepared in the same manner as for Example 1 except for the following. A mixture of two types of oxidized carbon blacks (SPECIAL BLACK 4 and SPECIAL BLACK 250, manufactured by Degussa Inc.) was used to prepare a polyamide acid NMP solution comprising 3,3, 4,4'-biphenyltetracarbonic acid (BPDA) and p-phenylenediamine (PDA), which was mixed in a ratio of 8:2 with polyamide acid NMP solution comprising 3,3', 4,4'-biphenyltetracarbonic acid (BPDA) and oxydianiline (ODA). After the completion of molding, a polyamide acid belt, which was hardened until it is able to support the same by itself, was peeled off of the inner surface of the mold, and the belt was applied onto an aluminum cylinder whose surface roughness (Ra) was 1.2 µm. Afterward, the polyamide acid belt was heated to 220° C. at a rate of 2° C./minute. During this process, the temperature was maintained at 220° C. for 30 minutes before continuing to be increased. Then, the temperature was raised to 300° C. at a rate of 2° C./minute and kept for 30 minutes. Consequently, the imide conversion reaction was completed. Then, in the same manner as for Example 1, surface roughness and planarity of the intermediate transfer belt were measured and an image was evaluated. The surface roughness was 0.9 µm, and the planarity was 4.2 mm. According to the image evaluation, although noise was prevented, slight color unevenness was observed, but this was not serious.

Example 4

A solution was prepared in the same manner as for Example 1 except for the following. An oxidized carbon black (SPECIAL BLACK 4 manufactured by Degussa Inc.) was used to prepare the solution. After the completion of molding, a polyamide acid belt, which was hardened until it was able to support itself, was peeled off from the inner surface of the mold. The belt was applied to an aluminum cylinder whose surface roughness (Ra) was 2.0 µm, the belt was heated to 250° C. at a rate of 2° C./minute, and the temperature thereof was maintained at 250° C. for a period of 3 hours. Later, the belt was heated to 300° C. at a rate of 2° C./minute, and kept for 30 minutes. Consequently, the imide conversion reaction was completed. Then, in the same manner as in Example 1, surface roughness and planarity of the intermediate transfer belt were measured, and an image was evaluated. The surface roughness was 1.5 µm, and the planarity was 1.2 mm. According to the image evaluation, an excellent image in which noise was prevented and without color unevenness was obtained.

Example 5

A solution was prepared in the same manner as for Example 1 except for the following. A mixture of two types of oxidized carbon blacks (SPECIAL BLACK 4 and SPECIAL BLACK 250, manufactured by Degussa Inc.) was used to prepare a polyamide acid NMP solution containing 3,3', 4,4'-biphenyltetracarbonic acid (BPDA) and p-phenylenediamine (PDA) was mixed in a ratio of 8:2 with a polyamide acid NMP solution containing 3,3', 4,4'-biphenyltetracarbonic acid (BPDA) and oxydianiline (ODA). After the completion of molding, a polyamide acid belt, which was hardened until it is able to support the same by itself, was peeled off from the inner surface of the mold, and the belt was molded onto an aluminum cylinder whose surface roughness (Ra) was 1.5 µm. Afterwards, the polyamide acid belt was heated to 220° C. at a rate of 2° C./minute. During this process, the temperature was maintained at 220° C. for 0.7 hours before continuing to be increased. Then, the temperature was raised to 300° C. at a rate of 2° C./minute, and kept for 30 minutes. Afterwards, the imide conversion reaction was completed. In the same manner as in Example 1, surface roughness and planarity of the intermediate transfer belt were measured and an image was evaluated. The surface roughness was 1.3 µm, and the planarity was 3.8 mm. According to the image evaluation, although noise was prevented, slight color unevenness was observed, but this was not serious.

Example 6

A solution was prepared in the same manner as for Example 1 except for the following. An oxidized carbon black (SPECIAL BLACK 4, manufactured by Degussa Inc.) was used to prepare the solution. After the completion of molding, a polyamide acid belt, which was hardened until it was able to support itself, was peeled off from the inner surface of the mold, and molded onto the outer surface of an aluminum cylinder whose surface roughness (Ra) was 2.0 µm. The belt was heated to 250° C. at a rate of 2° C./minute, and the temperature thereof was maintained at 250° C. for an hour. Later, the belt was further heated to 300° C. at a rate of 2° C./minute, and kept for 30 minutes. Afterwards, the imide conversion reaction was completed. Also, in the same manner as in Example 1, surface roughness and planarity of the intermediate transfer belt were measured, and image was evaluated. The surface roughness was 1.7 µm, and the planarity was 1.2 mm. According to the image evaluation, although some image noise was observed, color unevenness was prevented.

Example 7

A solution was prepared in the same manner as for Example 1 except for the following. A mixture of two types of oxidized carbon blacks (SPECIAL BLACK 4 and SPECIAL BLACK 250, manufactured by Degussa Inc.) was used to prepare a polyamide acid NMP solution containing 3,3', 4,4'-biphenyltetracarbonic acid (BPDA) and p-phenylenediamine (PDA) was mixed in a ratio of 8:2 with a polyamide acid NMP solution containing 3,3', 4,4'-biphenyltetracarbonic acid (BPDA) and oxydianiline (ODA). After the completion of molding, a polyamide acid belt, which was hardened until it was able to support itself, was peeled off from the inner surface of the mold, and molded onto the outer surface of an aluminum cylinder whose surface roughness (Ra) was 2.5 µm. Afterwards, the polyimide acid belt was heated to 220° C. at a rate of 2° C./minute, During this process, the temperature was maintained at 220° C. over a period of 0.7 hours before continuing to be increased, then, the temperature was raised to 300° C. at a rate of 2° C./minute, and kept for 30 minutes. Consequently, the imide conversion reaction was completed. Also, in the same manner as in Example 1, surface roughness and planarity of the intermediate transfer belt were measured and an image was evaluated. The surface roughness was 1.8 µm, and the planarity was 4.0 mm. According to the image evaluation, the image was extremely noisy and had some color unevenness, which was not serious. However, after the completion of use of the intermediate transfer member, the end portions of the intermediate transfer member revealed some marks which had come into contact with other members adjacent thereto.

COMPARATIVE EXAMPLES

Comparative Example 1

A solution was prepared in the same manner as for Example 1 except for the following. An oxidized carbon black (SPECIAL BLACK 4, manufactured by Degussa Inc.) was used to prepare the solution. After the completion of molding, a polyamide acid belt, which was hardened until it was able to support itself, was peeled off from the inner surface of the mold, and molded onto the outer surface of an aluminum cylinder whose surface roughness (Ra) was 1.8 µm. Afterwards. The polyamide acid belt was heated to 230° C. at a rate of 2° C./minute. During this process, the temperature was maintained at 230° C. for 0.4 hours before continuing to be increased. Then, the temperature was raised to 300° C. at a rate of 2° C./minute, and kept for 30 minutes. Consequently, the imide conversion reaction was completed. Also, in the same manner as in Example 1, surface roughness and planarity of the intermediate transfer belt were measured, and an image was evaluated. The surface roughness was 1.4 µm, and the planarity was 5.3 mm. According to the image evaluation, noise was prevented, but visually obvious color unevenness was observed.

Comparative Example 2

A solution was prepared in the same manner as for Example 1 except for the following. A mixture of two types of oxidized carbon blacks (SPECIAL BLACK 4 and SPECIAL BLACK 250, manufactured by Degussa Inc.) was used to prepare a polyamide acid NMP solution containing 3,3', 4,4'-biphenyltetracarbonic acid (BPDA) and p-phenylenediamine (PDA) was mixed in a ratio of 8:2 with a polyamide acid NMP solution which is formed of 3,3', 4,4'-biphenyltetracarbonic acid (BPDA) and oxydianiline (ODA). After the completion of molding, a polyamide acid belt, which was hardened until it is able to support the same by itself, was peeled off from the inner surface of the mold, and molded onto the outer surface of an aluminum cylinder whose surface roughness (Ra) is 1.2 µm. The belt was heated to 250° C. at a rate of 2° C./minute, and the temperature thereof was kept at 250° C. over a period of 0.2 hour. Then, the belt was heated again to 300° C. at a rate of 2° C./minute, and kept for 30 minutes. Consequently, the imide conversion reaction was completed. Also, in the same manner as in Example 1, surface roughness and planarity of the intermediate transfer belt were measured and an image was evaluated. The surface roughness was 0.9 µm, and the planarity was 6.0 mm. According to the image evaluation, noise was prevented, but some visually obvious color unevenness was observed, and it was discovered that the intermediate transfer belt had come into contact with other members adjacent thereto, causing electrical discharges, and thus causing loss of image.

Comparative Example 3

A solution was prepared in the same manner as for Example 1 except for the following. An oxidized carbon black (SPECIAL BLACK 4, manufactured by Degussa Inc.) was used to prepare the solution. After the completion of molding, a polyamide acid belt, which was hardened until it is able to support the same by itself, was peeled off from the inner surface of the mold, and molded onto the outer surface of an aluminum cylinder whose surface roughness (Ra) was 2.0 $\mu$m. Afterwards, the polyamide acid belt was heated to 200° C. at a rate of 2° C./minute. During this process, the temperature was maintained at 200° C. for 30 minutes before continuing to be increased. Then, the belt was heated again to 300° C. at a rate of 2° C./minute, and kept for 30 minutes. Consequently, the imide conversion reaction was completed. Also, in the same manner as in Example 1, surface roughness and planarity of the intermediate transfer belt were measured, and an image was evaluated. The surface roughness was 1.5 $\mu$m, and the planarity was 5.5 mm. According to the image evaluation, noise was prevented. However, visually obvious color unevenness was observed. Moreover, end portions of the intermediate transfer belt, which had come into contact with other members adjacent thereto, were noticeably damaged.

Comparative Example 4

A solution was prepared in the same manner as Example 1 except for the following description. A mixture of two types of oxidized carbon blacks (SPECIAL BLACK 4 and SPECIAL BLACK 250, manufactured by Degussa Inc.) was used to prepare the solution. After the completion of molding, a polyamide acid belt, which was hardened until it is able to support the same by itself, was peeled off from the inner surface of the mold. After the belt was molded onto an aluminum cylinder whose surface roughness (Ra) was 1.1 $\mu$m, the belt was heated to 280° C. at a rate of 2° C./minute, and then maintained at a temperature of 280° C. for a period of 0.2 hour. Then, the belt was heated again to 300° C. at a rate of 2° C./minute, and kept for 30 minutes. Consequently, the imide conversion reaction was completed. Also, in the same manner as in Example 1, surface roughness and planarity of the intermediate transfer belt were measured and image was evaluated. The surface roughness was 0.7 $\mu$m, and the planarity was 6.7 mm. According to the image evaluation, image was noisy. Visually obvious color unevenness was observed. Also, the intermediate transfer belt had come into contact with other members adjacent thereto such that discharges had occurred, and loss of image had occurred.

As described above, the present invention provides an intermediate transfer member used by a tandem type intermediate transfer image forming device, having a planarity with high accuracy, and capable of image transfer with high quality, and a production method of the intermediate transfer belt.

Further, the present invention provides an intermediate transfer member having uniform electric resistance, and highly accurate planarity and thickness with, and a fabrication method of the intermediate transfer member.

What is claimed is:

1. An intennediate transfer member for use in a tandem type color image forming device, the intermediate transfer member comprising an endless belt shape including as a main component a polyimide resin, wherein, when the intermediate transfer member is wrapped around two substantially parallel shafts and a tension load of 4 kg is applied to one of the shafts to longitudinally stretch the intermediate transfer member, the intermediate transfer member has a planarity of at most 5 mm.

2. The intermediate transfer member of claim 1, wherein surface roughness (Ra) of the intermediate transfer member is at most 1.5 $\mu$m.

3. The intermediate transfer member of claim 1, wherein the polyimide resin comprises at least one oxidized carbon black.

4. The intermediate transfer member of claim 1, wherein the polyimide resin comprises at least one oxidized carbon black in an amount of 10 to 30% by weight with respect to the polyimide resin.

5. The intermediate transfer member of claim 1, wherein the seamless belt comprises a thickness of 20 to 500 $\mu$m.

6. The intermediate transfer member of claim 1, wherein the planarity is at most 3 mm.

7. A tandem type color image forming device capable of printing a plurality of colors, the device comprising:
   the intermediate transfer member of claim 1;
   for each of the colors, a photoreceptor disposed at the intermediate transfer member; and
   for each of the photoreceptors, a developer unit provided for developing the color of its respective photoreceptor.

8. The intermediate transfer member of claim 1, wherein the intermediate transfer member is obtained by a process comprising the steps of:
   providing an intermediate transfer member precursor comprising polyamide acid;
   heating the precursor to an elevated temperature; and
   maintaining the precursor at a temperature which is equal to or less than the temperature for a period of at least 0.5 hours, thereby carrying out imide conversion of the polyamide acid.

9. The intermediate transfer member of claim 8, wherein surface roughness of the intermediate transfer member is at most 1.5 $\mu$m.

10. The intermediate transfer member of claim 8, wherein the polyimide resin comprises at least one oxidized carbon black.

11. A fabricating method for an intermediate transfer member, the method comprising the steps of:
   preparing a solution of polyamide acid;
   supplying the solution to an inner surface of a cylindrical mold and forming a film of the solution thereat;
   hardening the film by heating so as to form therefrom a belt capable of retaining a belt shape when unsupported;
   thereafter, removing the belt from the cylindrical mold;
   disposing the belt at an outer surface of a metal cylinder; and
   heating the belt to an elevated temperature and carrying out an imide conversion reaction by maintaining the belt at a temperature of from 220 to 280° C. for at least 0.5 hours.

12. The method of claim 11, wherein the intermediate transfer member comprises an endless belt shape including as a main component a polyimide resin, and the intermediate transfer member has planarity of at most 5 mm.

13. A fabricating method for an intermediate transfer member, the method comprising the steps of:
   preparing a solution of polyamide acid;
   supplying the solution to an inner surface of a cylindrical mold and forming a film of the solution thereat;
   hardening the film by heating so as to form therefrom a belt capable of retaining a belt shape when unsupported;
   thereafter, removing the belt from the cylindrical mold;
   disposing the belt at an outer surface of a metal cylinder having surface roughness of from 1.2 to 2.0 $\mu$m; and heating the belt for carrying out an imide conversion reaction.

14. The method of claim 13, wherein the intermediate transfer member comprises an endless belt shape including as a main component a polyimide resin, and wherein, when the intermediate transfer member is wrapped around two substantially parallel shafts and a tension load of 4 kg is applied to one of the shafts to longitudinally stretch the intermediate transfer member, the intermediate transfer member has a planarity of at most 5 mm.

* * * * *